US012196268B2

(12) United States Patent
Hutchison

(10) Patent No.: US 12,196,268 B2
(45) Date of Patent: Jan. 14, 2025

(54) RETENTION ASSEMBLY FOR BEARING HOUSING ASSEMBLY

(71) Applicant: Schaeffler Technologies AG & Co. KG, Herzogenaurach (DE)

(72) Inventor: Chris Hutchison, Gastonia, NC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 94 days.

(21) Appl. No.: 18/153,497

(22) Filed: Jan. 12, 2023

(65) Prior Publication Data

US 2024/0240671 A1 Jul. 18, 2024

(51) Int. Cl.
*F16C 35/073* (2006.01)
*F16C 33/58* (2006.01)
*F16C 35/063* (2006.01)

(52) U.S. Cl.
CPC .......... *F16C 35/073* (2013.01); *F16C 33/586* (2013.01); *F16C 35/063* (2013.01)

(58) Field of Classification Search
CPC .... F16C 33/583; F16C 33/586; F16C 33/605; F16C 35/063; F16C 35/073
See application file for complete search history.

(56) References Cited

U.S. PATENT DOCUMENTS

| 5,685,650 A | * | 11/1997 | Martinie | ............... | F16C 35/073 |
| | | | | | 384/585 |
| 6,425,690 B1 | * | 7/2002 | DeWachter | ........... | F16C 33/586 |
| | | | | | 384/585 |
| 2006/0093251 A1 | * | 5/2006 | Casey | ................... | F16C 35/073 |
| | | | | | 384/538 |

* cited by examiner

*Primary Examiner* — James Pilkington
(74) *Attorney, Agent, or Firm* — Volpe Koenig

(57) ABSTRACT

A retention assembly for a bearing assembly is disclosed herein. The retention assembly includes an inner ring defining an outer surface including a shoulder on an axial end of the inner ring. The outer surface includes at least one first area having a tapered profile and at least one second area defining a seat with the shoulder defined between the at least one first area and the at least one second area. A collar includes an inner surface defining a groove. A snap ring is arranged partially within the groove of the collar and is configured to face the shoulder and the seat of the inner ring.

12 Claims, 3 Drawing Sheets

RETENTION ASSEMBLY FOR BEARING HOUSING ASSEMBLY

FIELD OF INVENTION

The present disclosure relates to a bearing housing assembly, and more particularly relates to a retention assembly for a bearing housing assembly.

BACKGROUND

Bearing housing assemblies are well known. One specific type of a bearing housing assembly is a pillow bearing. A retention assembly for one type of pillow bearing is shown in FIG. 1. As shown in FIG. 1, a bearing seal 4 and an inner ring 6, as well as other bearing components, are retained against a collar 2 that can be threaded with a sleeve 7. An end ring 3 can be retained with the collar 2. A snap ring 5 can generally be secured between a groove 6a formed on the inner ring 6 and a groove 2a formed on the collar 2. In these known configurations, the inner ring 6 can experience fracturing or other failure, typically in area of reduced cross-sectional thickness near the groove 6a.

It would be desirable to provide a more durable inner ring configuration for a retention assembly of a bearing housing assembly.

SUMMARY

A retention assembly for a bearing assembly is disclosed herein that includes a more durable inner ring configuration such that the inner ring is less prone to fracture or failure. The retention assembly includes an inner ring defining an outer surface including a shoulder on an axial end of the inner ring. The outer surface includes at least one first area having a tapered profile and at least one second area defining a seat with the shoulder defined between the at least one first area and the at least one second area. A collar includes an inner surface defining a groove. A snap ring is arranged partially within the groove of the collar and is configured to face the shoulder and the seat of the inner ring. The at least one second area of the outer surface of the inner ring has a flat profile. The tapered profile of the at least one first area can taper radially outward in an axially inward direction. The tapered profile can have an angle of 5 degrees-20 degrees. One of ordinary skill in the art would understand that the geometry of the tapered profile can vary.

It would be desirable to provide a more durable inner ring configuration for a retention assembly of a bearing housing assembly.

The inner ring can be configured to define a support surface for the snap ring on: (i) a radially inner side of the snap ring, and (ii) a single axial side of the snap ring.

A first gap (G1) can be defined between the collar and the inner ring in an area of the at least one second area, and a second gap (G2) can be defined between the collar and the inner ring in an area of the at least one first area, and the first gap can be greater than the second gap.

An inner ring for a bearing housing assembly is also disclosed herein. The inner ring can include an outer surface defining at least one raceway in a medial region, and a shoulder on an axial end. The outer surface can further define at least one first area having a tapered profile and at least one second area defining a seat configured to support a snap ring. The shoulder can be defined between the at least one first area and the at least one second area.

The at least one second area of the outer surface of the inner ring can have a flat profile. The tapered profile of the at least one first area can taper radially outward in an axially inward direction.

A first thickness (T1) can be defined by the inner ring in an area of the seat, and a second thickness (T2) can be defined by an axially outermost portion of the inner ring, and the first thickness (T1) can be greater than or equal to the second thickness (T2).

A third thickness (T3) can be defined in an area of the shoulder, and the third thickness (T3) can be greater than or equal to the second thickness (T2).

A method of installing a retention assembly on a bearing assembly is also provided herein. The method includes providing: an inner ring defining an outer surface including a shoulder on an axial end of the inner ring. The outer surface includes at least one first area having a tapered profile and at least one second area defining a seat with the shoulder defined between the at least one first area and the at least one second area. The method also includes providing a collar including an inner surface defining a groove, and a snap ring. The method includes inserting the collar with snap ring already installed in an axial direction relative to the inner ring, such that the snap ring is retained within the groove of the collar and against the shoulder of the inner ring.

The at least one second area of the outer surface of the inner ring can have a flat profile, and the tapered profile of the at least one first area can taper radially outward in an axially inward direction.

A first thickness (T1) can be defined by the inner ring in an area of the seat, and a second thickness (T2) can be defined by an axially outermost portion of the inner ring, and the first thickness (T1) can be greater than or equal to the second thickness (T2). A third thickness (T3) can be defined in an area of the shoulder, and the third thickness (T3) can be greater than or equal to the second thickness (T2).

The inner ring can be configured to define a support surface for the snap ring on: (i) a radially inner side of the snap ring, and (ii) a single axial side of the snap ring.

The tapered profile of the at least one second area can taper such that the at least one second area is least at an axially outermost region.

Additional embodiments are disclosed herein.

BRIEF DESCRIPTION OF THE DRAWINGS

The foregoing Summary and the following Detailed Description will be better understood when read in conjunction with the appended drawings, which illustrate an embodiment of the disclosure. In the drawings.

DETAILED DESCRIPTION

Certain terminology is used in the following description for convenience only and is not limiting. "Axially" refers to a direction along an axis (X) of an assembly. "Radially" refers to a direction inward and outward from the axis (X) of the assembly.

A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

Figure 2:
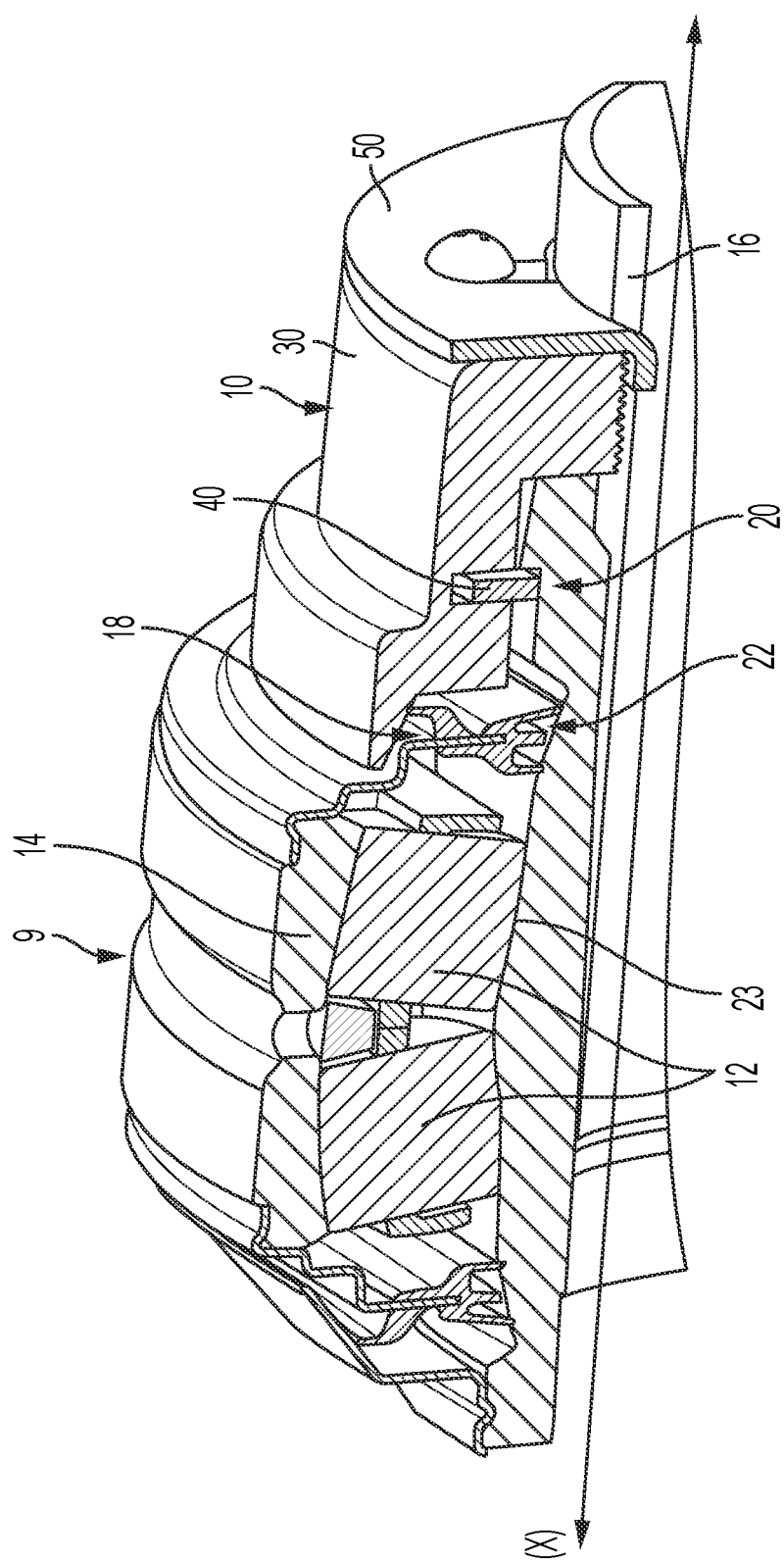
FIG. 2 is a perspective cross-sectional view of a bearing assembly including a retention assembly according to one embodiment.
Figure 3:
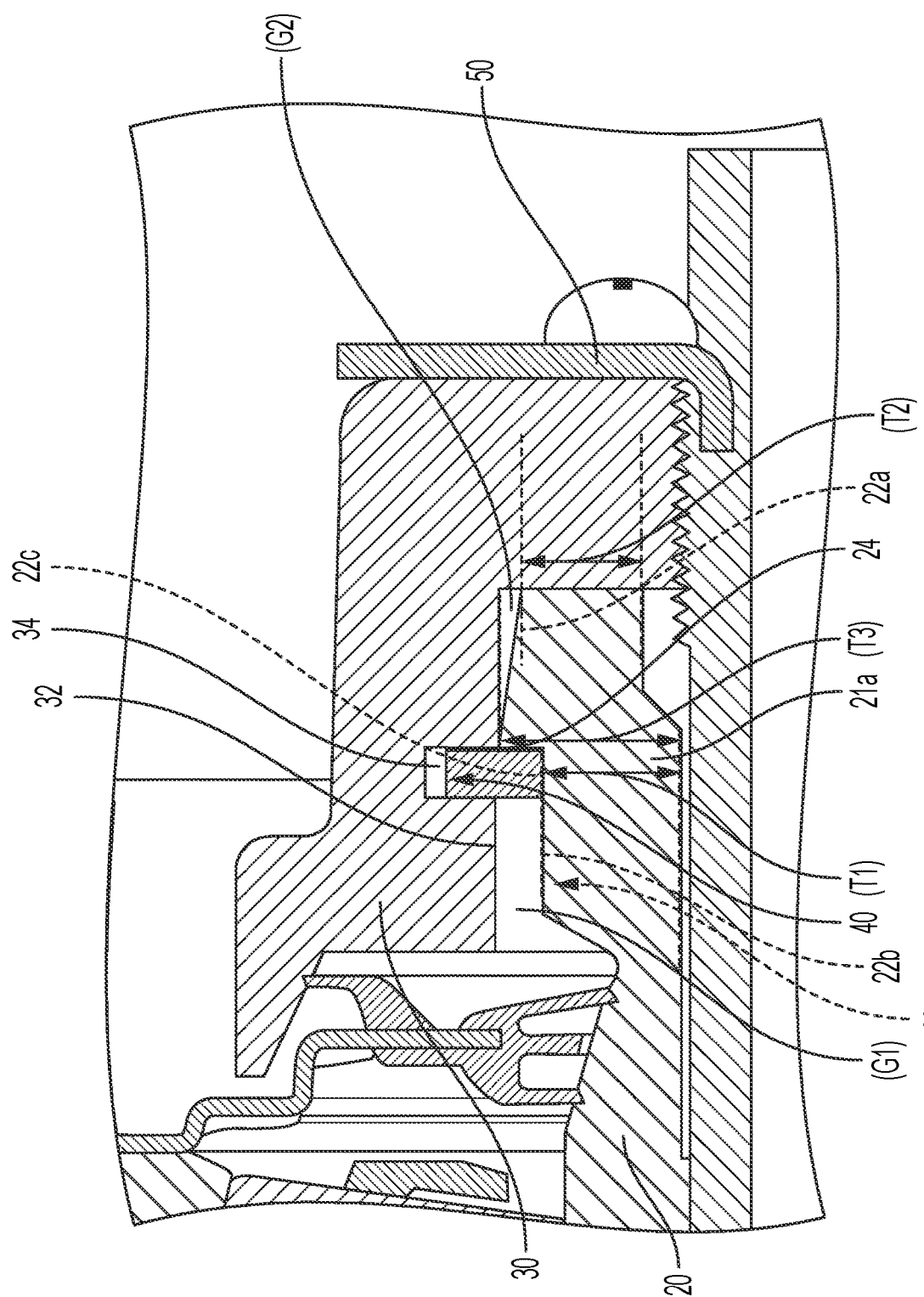
FIG. 3 is a magnified cross-sectional view of the retention assembly of FIG. 2.

As shown in FIGS. 2 and 3, a retention assembly 10 is provided. The retention assembly 10 can generally be arranged on an axial side of a bearing assembly 9. The bearing assembly 9 can include at least one row of rolling elements 12, an outer ring 14, and other components or elements, such as rolling element cages, retention rings, etc. The bearing assembly is supported on a sleeve 16 and includes a seal 18.

The retention assembly 10 can include an inner ring 20 defining an outer surface 22 including a shoulder 24 on an axial end 21a of the inner ring 20. The outer surface 22 can include at least one first area 22a having a tapered profile and at least one second area 22b defining a seat 22c with the shoulder 24 defined between the at least one first area 22a and the at least one second area 22b. The outer surface 22 can define at least one raceway 23 in a medial region for the rolling elements 12.

A collar 30 can be provided that includes an inner surface 32 defining a groove 34. The collar 30 can include a threading that is configured to matingly engage with a corresponding threading on the sleeve 16. An end ring 50 can also be provided that is configured to define an axial retainer for the collar 30. A fastening element can extend through the end ring 50 to fix the end ring 50 with the collar 30.

An internal snap ring 40 can be arranged partially within the groove 34 of the collar 30 and can be configured to face the shoulder 24 and the seat 22c of the inner ring 20 after installation. The internal snap ring 40 has a diameter such that it can be retained in the groove 34 in a relaxed state prior to installation of the collar 30 to the inner ring 20. The groove 34 has a depth that allows radial expansion of the internal snap ring 40 during installation of the collar 30 to the inner ring 20. Accordingly, as the collar 30 is telescoped over the inner ring 20 the internal snap ring 40 is urged radially outwardly by the taper of surface 22a and expands deeper into the groove 34. Once the internal snap ring 40 advances beyond the shoulder 24, the internal snap ring 40 returns to its relaxed state and floats in the radial direction between the inner ring 20 and the collar 30. In this position, the internal snap ring 40 prevents the collar 30 from backing off the inner ring 20.

The at least one second area 22b of the outer surface of the inner ring 20 can have a flat profile (i.e. a constant radially outer diameter).

The tapered profile of the at least one first area 22a can be configured to taper radially outward in an axially inward direction. Stated differently, the tapered profile can be ramped in an outward direction when viewed from the axially exterior end. In one example, the tapered profile of the at least one first area 22a has a tapering angle of 5 degrees-20 degrees. One of ordinary skill in the art would understand that this value can vary.

Figure 1:
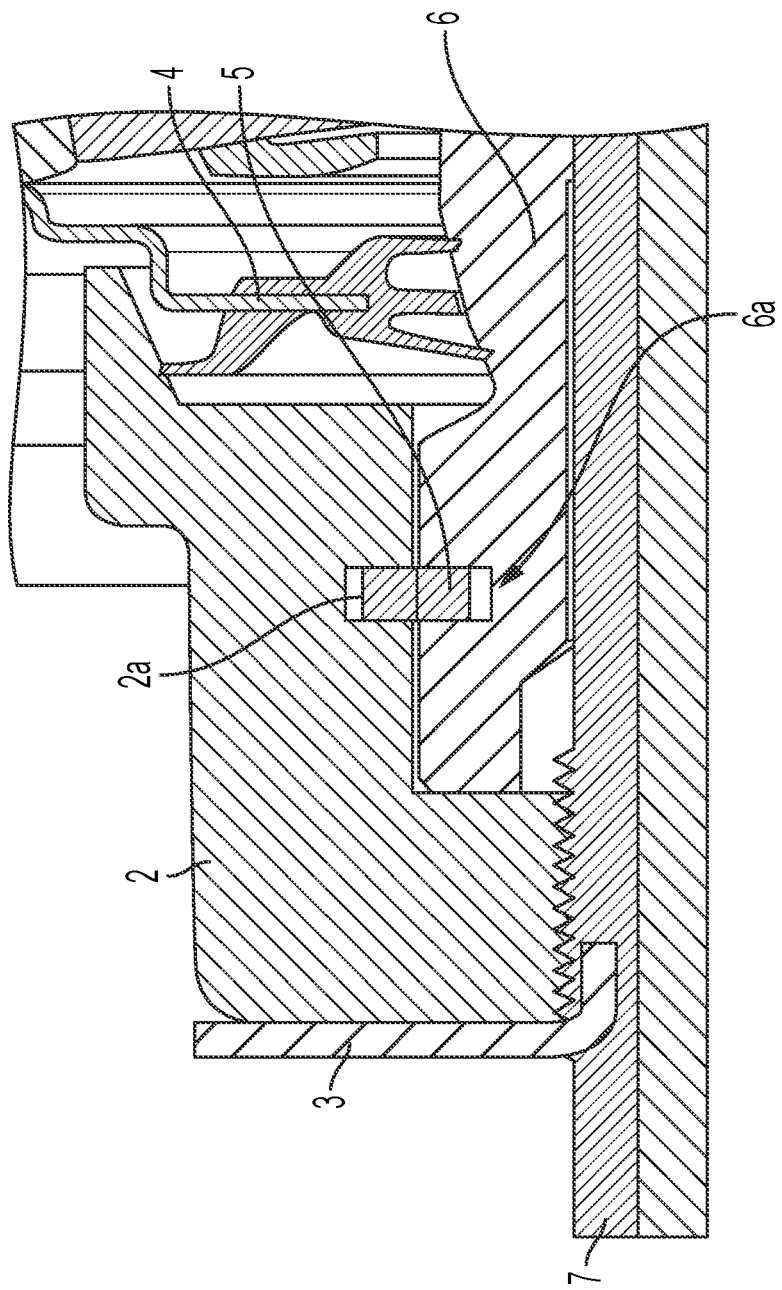
FIG. 1 is a cross-sectional view of a retention assembly according to the prior art.

As shown in FIG. 3, a first thickness (T1) can be defined by the inner ring 20 in an area of the seat 22c, and a second thickness (T2) can be defined by an axially outermost portion of the inner ring 20. The first thickness (T1) can be greater than or equal to the second thickness (T2), although this is not required. As compared to the prior art assembly of FIG. 1, the inner ring 20 has an increased thickness in a region of the area that is configured to secure the internal snap ring 40 thereby reducing cracking or failure of the inner ring 20. A third thickness (T3) can be defined in an area of the shoulder 24, and the third thickness (T3) can be greater than or equal to the second thickness (T2).

The inner ring 20 can be configured to engage the internal snap ring 40 on: (i) a radially inner side of the snap ring 40, and (ii) a single axial side of the snap ring 40. Stated differently, the inner ring 20 only engages two sides or surfaces of the internal snap ring 40. As noted above, the internal snap ring 40 floats in the axial direction. As such, an inner diameter of the internal snap ring 40 can be larger than an outer dimeter of outer surface 22 of the inner ring 20.

As shown in FIG. 3, a first gap (G1) can be defined between the collar 30 and the inner ring 20 in an area of the at least one second area 22b, and a second gap (G2) can be defined between the collar 30 and the inner ring 20 in an area of the at least one first area 22a. The first gap (G1) can be greater than the second gap (G2). The second gap (G2) can have a non-constant size or profile in the axial direction due to the tapered profile of the at least one first area 22a.

Having thus described the present disclosure in detail, it is to be appreciated and will be apparent to those skilled in the art that many physical changes, only a few of which are exemplified in the detailed description of the invention, could be made without altering the inventive concepts and principles embodied therein.

It is also to be appreciated that numerous embodiments incorporating only part of the present embodiment are possible which do not alter, with respect to those parts, the inventive concepts and principles embodied therein.

The present embodiment and optional configurations are therefore to be considered in all respects as exemplary and/or illustrative and not restrictive, the scope of the embodiments being indicated by the appended claims rather than by the foregoing description, and all alternate embodiments and changes to this embodiment which come within the meaning and range of equivalency of said claims are therefore to be embraced therein.

LOG OF REFERENCE NUMERALS

Collar 2
Groove 2a
End Ring 3
Seal 4
Snap Ring 5
Inner Ring 6
Groove 6a
Sleeve 7
Bearing Assembly 9
Retention Assembly 10
Rolling Elements 12
Outer Ring 14
Sleeve 16
Seal 18
Inner Ring 20
Axial end 21a of inner ring
Outer surface 22
First area 22a
Second area 22b
Seat 22c
Raceway 23
Shoulder 24
Collar 30
Inner surface 32 of collar
Groove 34
Snap Ring 40
End Ring 50

What is claimed:

1. A retention assembly for a bearing assembly, the retention assembly comprising:
an inner ring defining an outer surface including a shoulder on an axial end of the inner ring, the outer surface including at least one first area having a tapered profile and at least one second area defining a seat with the shoulder defined between the at least one first area and the at least one second area;
a collar including an inner surface defining a groove; and
a snap ring arranged partially within the groove of the collar and configured to face the shoulder and the seat of the inner ring;
wherein a first thickness is defined by the inner ring in an area of the seat, and a second thickness is defined by an axially outermost portion of the inner ring, and the first thickness is greater than or equal to the second thickness;
wherein a third thickness is defined in an area of the shoulder, wherein the third thickness is greater than or equal to the second thickness; and
wherein the tapered profile of the at least one first area tapers continuously radially outward in an axially inward direction from the second thickness at the axially outermost portion of the inner ring to the third thickness at the shoulder.

2. The retention assembly according to claim 1, wherein the at least one second area of the outer surface of the inner ring has a flat profile.

3. The retention assembly according to claim 1, wherein the tapered profile has an angle of 5 degrees-20 degrees.

4. The retention assembly according to claim 1, wherein the inner ring is configured to define a support surface for the snap ring on:
(i) a radially inner side of the snap ring, and
(ii) a single axial side of the snap ring.

5. The retention assembly according to claim 1, wherein a first gap is defined between the collar and the inner ring in an area of the at least one second area, and a second gap is defined between the collar and the inner ring in an area of the at least one first area, wherein the first gap is greater than the second gap.

6. An inner ring for a bearing housing assembly, the inner ring comprising:
an outer surface defining at least one raceway in a medial region, and a shoulder on an axial end,
the outer surface further defining at least one first area having a tapered profile and at least one second area defining a seat configured to engage a snap ring,
wherein the shoulder is defined between the at least one first area and the at least one second area;
wherein a first thickness is defined by the inner ring in an area of the seat, and a second thickness is defined by an axially outermost portion of the inner ring, and the first thickness is greater than or equal to the second thickness;
wherein a third thickness is defined in an area of the shoulder, wherein the third thickness is greater than or equal to the second thickness; and
wherein the tapered profile of the at least one first area tapers continuously radially outward in an axially inward direction from the second thickness at the axially outermost portion of the inner ring to the third thickness at the shoulder.

7. The inner ring according to claim 6, wherein the at least one second area of the outer surface of the inner ring has a flat profile.

8. A method of installing a retention assembly on a bearing assembly, the method comprising:
providing:
an inner ring defining an outer surface including a shoulder on an axial end of the inner ring, the outer surface including at least one first area having a tapered profile and at least one second area defining a seat with the shoulder defined between the at least one first area and the at least one second area wherein a first thickness is defined by the inner ring in an area of the seat, and a second thickness is defined by an axially outermost portion of the inner ring, and the first thickness is greater than or equal to the second thickness, wherein a third thickness is defined in an area of the shoulder, wherein the third thickness is greater than or equal to the second thickness, and wherein the tapered profile of the at least one first area tapers continuously radially outward in an axially inward direction from the second thickness at the axially outermost portion of the inner ring to the third thickness at the shoulder;
a collar including an inner surface defining a groove; and
a snap ring installed in the groove;
inserting the collar in an axial direction relative to the inner ring such that the snap ring is retained within the groove of the collar and against the shoulder of the inner ring.

9. The method according to claim 8, wherein the at least one second area of the outer surface of the inner ring has a flat profile.

10. The method according to claim 8, wherein the inner ring is configured to define a support surface for the snap ring on:
(i) a radially inner side of the snap ring, and
(ii) a single axial side of the snap ring.

11. The method according to claim 8, wherein a first gap is defined between the collar and the inner ring in an area of the at least one second area, and a second gap is defined between the collar and the inner ring in an area of the at least one first area, wherein the first gap is greater than the second gap.

12. The method according to claim 8, wherein the tapered profile of the at least one second area tapers such that the at least one second area is least at an axially outermost region.

* * * * *